Aug. 28, 1945. J. E. COXON ET AL 2,383,532
LIQUID FUEL TANK FOR AIRCRAFT
Filed Aug. 7, 1943 6 Sheets-Sheet 1
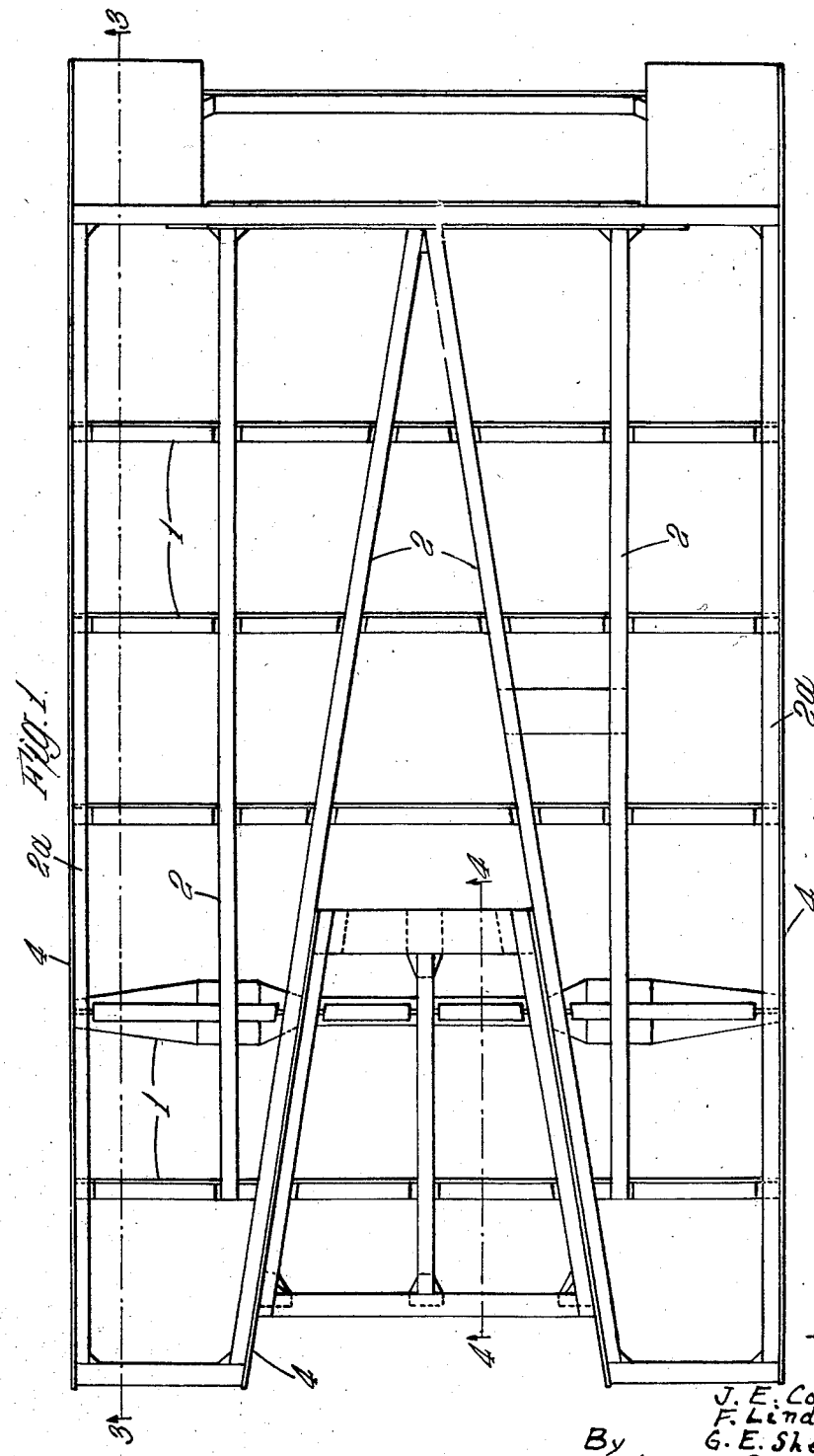
Inventors
J. E. Coxon,
F. Lindsley, and
G. E. Shelley
By Young, Emery & Thompson
Attys.

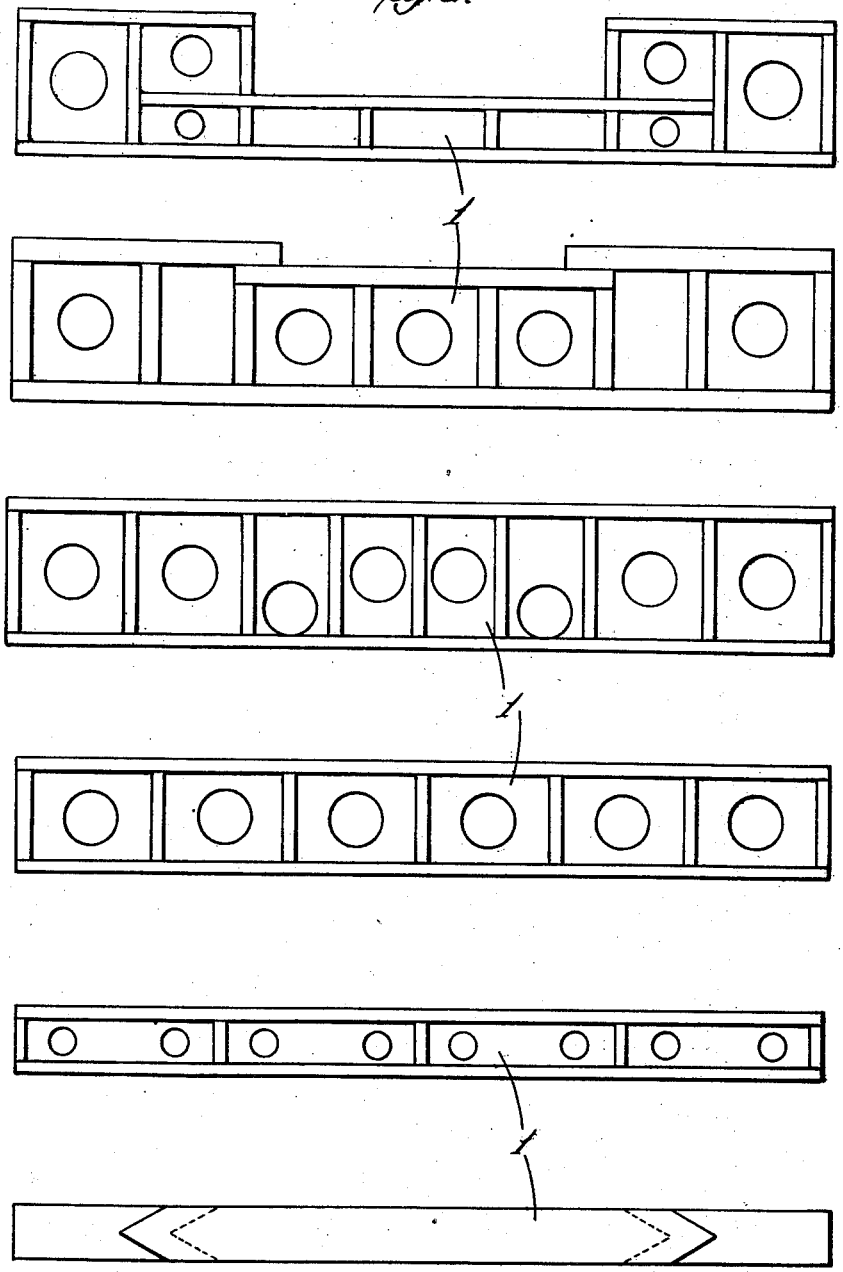

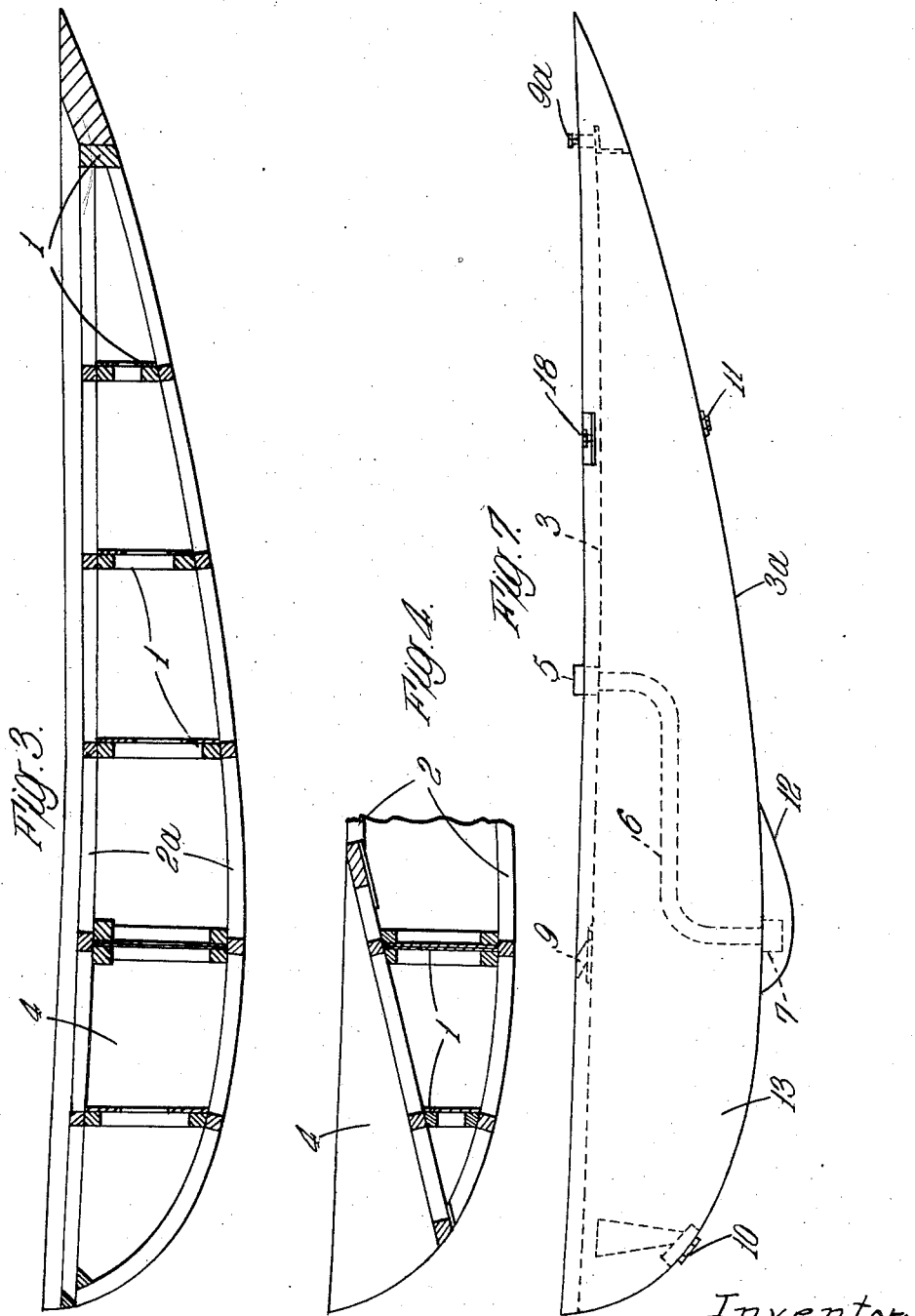

Aug. 28, 1945.   J. E. COXON ET AL   2,383,532
LIQUID FUEL TANK FOR AIRCRAFT
Filed Aug. 7, 1943   6 Sheets-Sheet 4
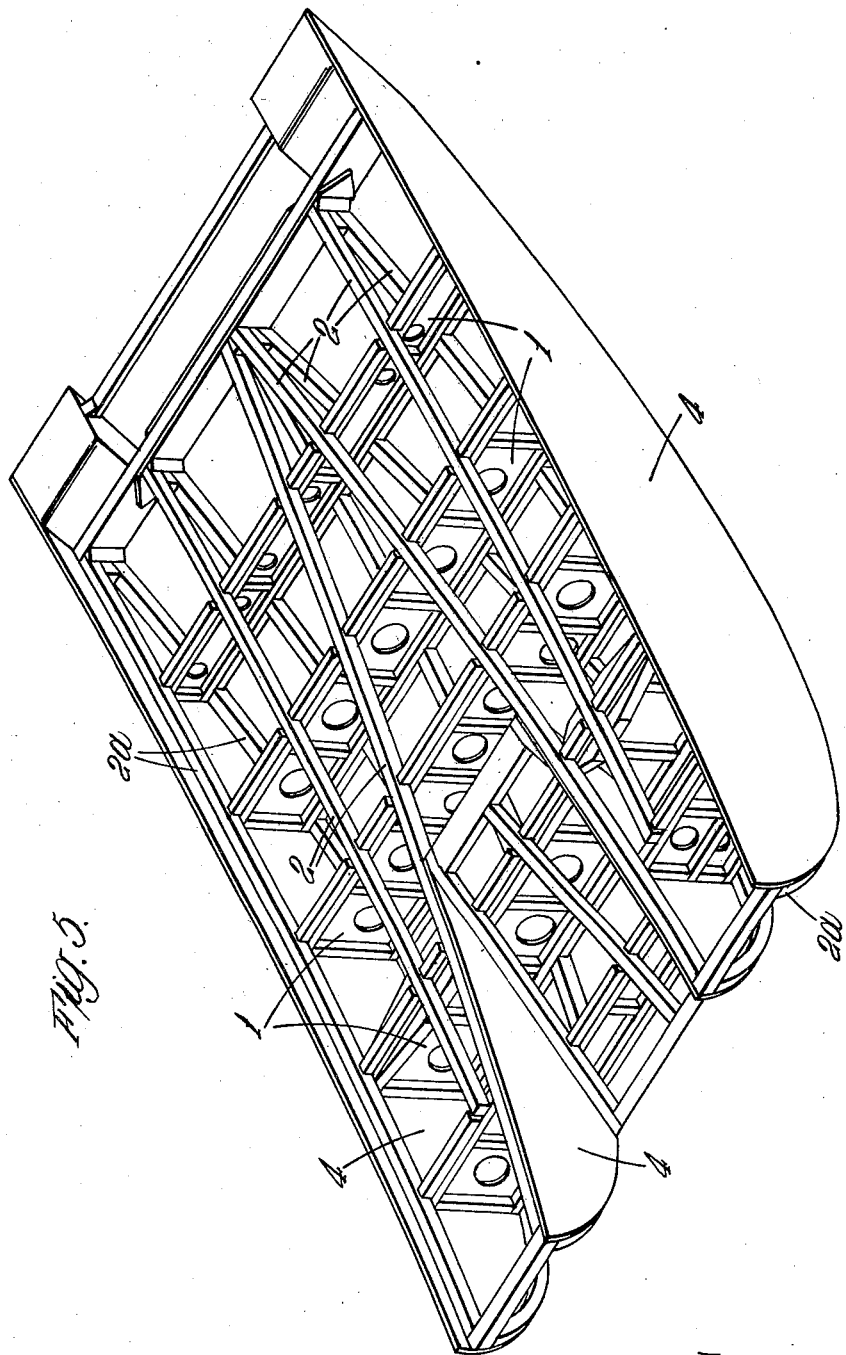
Inventors,
J. E. Coxon,
F. Lindsley, and
G. E. Shelley
By Young, Emery & Thompson
Attys.

Aug. 28, 1945.     J. E. COXON ET AL     2,383,532
LIQUID FUEL TANK FOR AIRCRAFT
Filed Aug. 7, 1943     6 Sheets-Sheet 5
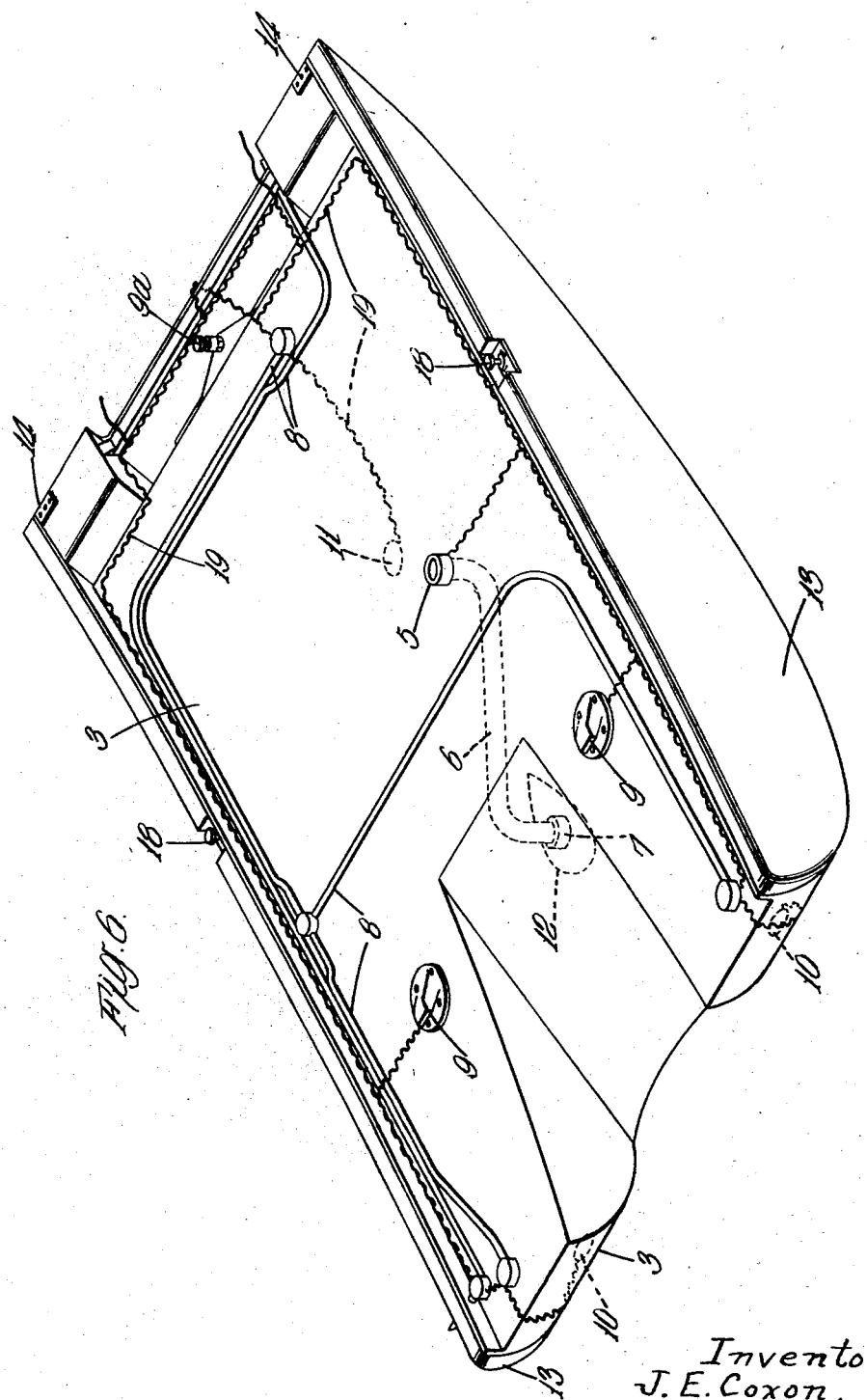
Inventors,
J. E. Coxon,
F. Lindsley, and
G. E. Shelley
By Aug. 28, 1945. J. E. COXON ET AL 2,383,532
LIQUID FUEL TANK FOR AIRCRAFT
Filed Aug. 7, 1943 6 Sheets-Sheet 6
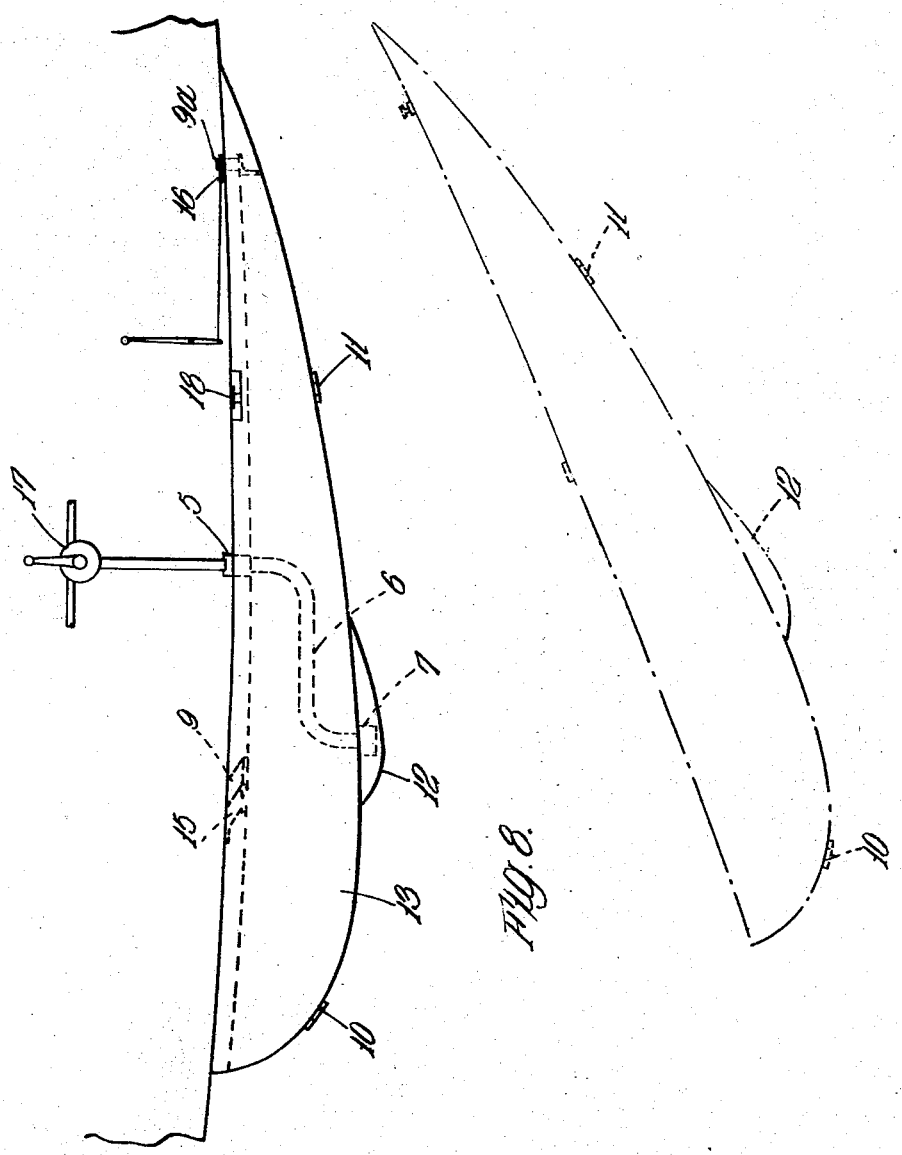
Inventors,
J. E. Coxon,
F. Lindsley, and
G. E. Shelley
By Young, Emery & Thompson
Attys.

Patented Aug. 28, 1945

2,383,532

UNITED STATES PATENT OFFICE 2,383,532

LIQUID FUEL TANK FOR AIRCRAFT

John Ernest Coxon, Lowfield Heath, near Crawley, Forester Lindsley, Lambourne Woodlands, near Newbury, and Gordon Eric Shelley, Horley, England, assignors to Southern Aircraft (Gatwick) Limited, Surrey, England, a company of Great Britain Application August 7, 1943, Serial No. 497,836
In Great Britain August 21, 1942

4 Claims. (Cl. 244—135)

This invention relates to tanks for housing highly volatile liquids such as petrol in an airtight and liquid tight manner and adapted more particularly for use on aircraft.

To increase the range of aircraft it is already known to provide fuel tanks which are removably attached to an aircraft in a mechanical manner so that in any emergency or when such a tank is empty it can be detached and jettisoned, thereby relieving the aircraft of unneccessary load. While it has been proposed to make parts of such petrol tanks of plywood, yet to the best of our knowledge they have been made chiefly of metal and where therefore such tanks have been made to serve as auxiliary tanks capable of being jettisoned and their recovery was not intended the material and labour employed in their construction were lost.

According now to the present invention, apart from the filler connections and the means for its attachment to the aircraft, the whole structure of the tank is made of timber, thus involving the expenditure of less valuable materials than the metals required for metal fuel tanks and resulting in a tank construction which is cheaper to manufacture and in addition is lighter in weight when compared with metal constructions necessary to produce a tank of equal capacity. A further advantage resulting from the use of such cheaper material in the construction is that in jettisoning the tank, if need be, say in time of war over enemy territory, a tank constructed according to our invention will on striking the ground invariably break into fragments and thus be of no benefit to the enemy.

Accordingly the invention consists of a streamlined substantially boat or float shaped liquid fuel tank for use in aircraft, the tank structure proper of which consists entirely of wood made completely gas and liquid tight and adapted to be readily attached to and detached from the aircraft mechanically in a simple manner at will.

According to one practical form which we have found to be both reliable and commercially very economical, the construction involves fundamentally a number of cross members or bulkheads preferably of the girder type each extending practically the full width and height of the tank and laminated spars to which top and bottom skins are appropriately attached, while the sides are provided peripherally with similar spars and after assembly of these components in a jig, the requisite fittings are applied and the construction is completed so as to provide against all leakages as will hereinafter be fully explained.

A fuel tank thus constructed and adapted for use as a jettison tank according to this invention is illustrated by way of example in the accompanying drawings in which Fig. 1 illustrates in plan view the fundamental wooden framework or skeleton of the structure;

Fig. 2 shows in elevation the various forms of the series of bulkheads preferably employed therein to form the transverse or cross members of the structure;

Fig. 3 is a longitudinal sectional view taken on the line 3—3 of Fig. 1;

Fig. 4 is a longitudinal section on the line 4—4 of Fig. 1;

Fig. 5 is a perspective view of the assembly of the parts of the fundamental frame structure of the tank;

Fig. 6 is a similar view of the finished tank;

Fig. 7 illustrates a side elevation of the tank, shown in Figs. 3 and 6 and

Fig. 8 is a diagrammatical view of the tank shown attached to the bottom of the fuselage of an aircraft and indicating in dotted lines the detached tank in its fall from the aircraft.

Briefly first referring to Fig. 8 of these drawings, it will be seen that the tank, being of a streamline type, is attached to the bottom of the fuselage of the aircraft in a manner as will be referred to later on, so that it can be released by a mechanical operation and jettisoned whenever desired or necessary.

Referring now more particularly to Figs. 1, 2 and 5, the skeleton or frame structure proper of the tank comprises a number (in the example shown, six) of cross members or bulkheads 1, each extending as shown substantally across the full width and depth of the consecutive portions of the tank. These individual bulkheads as likewise clearly shown in Fig. 2 are constructed in the form of girders, each consisting of boards provided with openings in suitably chosen places and partitioned in a lattice like manner with strengthening or thickened parts. The top and bottom edges of these bulkheads 1 are provided at preselected points with recesses aligned likewise in a preselected manner in order to accommodate longitudinally extending laminated spars 2, which in the construction illustrated extend substantially from end to end of the tank both at the top and bottom thereof. The top and bottom of the tank are constituted by walls 3 and 3a (see Figs. 6 and 7) which are attached to the spars 2 and thus are spaced from the bulkheads 1 by the thickness of the spars. The side walls 4 (see Figs. 3, 4 and 5) are provided peripherally with similar spars 2a (see also Fig. 1). The bulkheads 1 are with advantage constructed of spruce and plywood while the laminated spars are conveniently made of spruce, although of course timber of other suitable kind may be employed where preferred or more readily obtainable.

For the assembly of these parts the bulkheads are first set in a jig and then the top and bottom are fitted with the laminated spars 2 and the side spars 2a and side walls 4 are attached. The assembly is then removed from the jig and the top wall 3 is attached. The interior of the tank is then treated with a petrol resisting paint or coating composition. The feed connection 5 (see Figs. 6, 7 and 8) as well as the feed pipe 6, the sump 7, the vent system 8 and the fittings 9 for securing the tank to the aircraft in a mechanically detachable manner, are then fitted therein. Thereafter the bottom wall 3a, previously proofed on its inner surface with glue, size, or other suitable coating composition, and provided with filler connections 10 and drain 11, is glued to the tank. The sump 7 is anchored to the bottom wall 3a and projects through it, as shown in Figs. 7 and 8. It is covered by a fairing 12 which is glued in position thereon. Fairings 13 are also secured to the sides of the tank. These fairings may consist of balsa, aubecia, calcium alginate or cellulose acetate moulding. The tank proper is also covered with doped fabric to protect it from the weather and also to form an additional safeguard against petrol leakage. Any holes in the walls or leaks as well as internal end grains in the wood are treated with sealing composition such as "Beetle" cement type "A," Nobel fuel resisting compound, or I. C. I. nitro-cellulose slushing fluid. The leading and trailing edges of the tank are with advantage reinforced, preferably with spruce and protected by mild steel cover plates 14 as indicated in Fig. 6.

The fittings for securing the tank to the aircraft in a releasable manner preferably comprise forwardly extending lugs 9 (see particularly Fig. 6) on the top of the tank towards the front and a shouldered peg 9a carried in a hole preferably in a metal plate flush with the top 3 towards the rear of the tank. The lugs 9 are adapted to engage straps 15 (see Fig. 8) on the bittom of the aircraft and the shoulder on the pin 9a is adapted to be gripped by releasable holding means 16 embodied in the aircraft. When the pin 9a is released the trailing end of the tank can drop and the lugs 9 become disengaged from the straps 15. The fuel feed connection on the aircraft may be provided with a self-closing valve 17 preferably of the three-way type. In order to guard against play when the tank is secured to the aircraft, stabilising bolts 18 are provided on either side of the tank (see Figs. 6, 7 and 8) intermediate the front and rear fastener fittings.

The fuel pipe 6, the vent system 8 and all other fittings if of metal are provided with electrical earth connections 19 as indicated in Fig. 6.

While in the foregoing we have disclosed by way of example a practical timber construction of the tank which we have found to be economical and reliable after being subjected to every conceivable test, we wish it to be understood that the invention should not be deemed limited thereto, for it will be obvious that modifications in the structure described will be readily conceived by those skilled in the art as may be called for by the size or shape of the tank required and also that the particular materials mentioned need not be adhered to where circumstances may make it desirable or necessary to employ reliable substitutes.

We claim:

1. A jettison tank for aircraft comprising a streamlined substantially boat shaped liquid fuel container having walls and stiffening members which consist entirely of wood and made gas and liquid tight, and means on said container for connecting it to the aircraft in a mechanically detachable manner, said stiffening members including bulkheads of wood extending transversely from side to side of the container and over the full width and depth thereof and spars extending longitudinally of the container across the upper and lower faces of said bulkheads.

2. A fuel tank as claimed in claim 1 in which walls to form the top and bottom of the container are attached to the spars, and side walls provided peripherally with similar spars are secured to the spars and bulkheads to form the lateral edges thereof.

3. A fuel tank as claimed in claim 1 comprising feed connections and fittings, filler connections, a drain, mounted in the walls of the container, and a sump projecting through the bottom wall thereof.

4. A fuel tank as claimed in claim 1 wherein the container is shaped to fit snugly against the bottom of the fuselage of the aircraft and wherein the connecting means are engaged by and mechanically disengageable from means operable from the control of the aircraft for the purpose of releasing and jettisoning the tank.

JOHN ERNEST COXON.
FORESTER LINDSLEY.
GORDON ERIC SHELLEY.